(No Model.) 6 Sheets—Sheet 4.
C. L. & W. T. BESSONETTE.
COTTON COMPRESS.
No. 530,001. Patented Nov. 27, 1894.
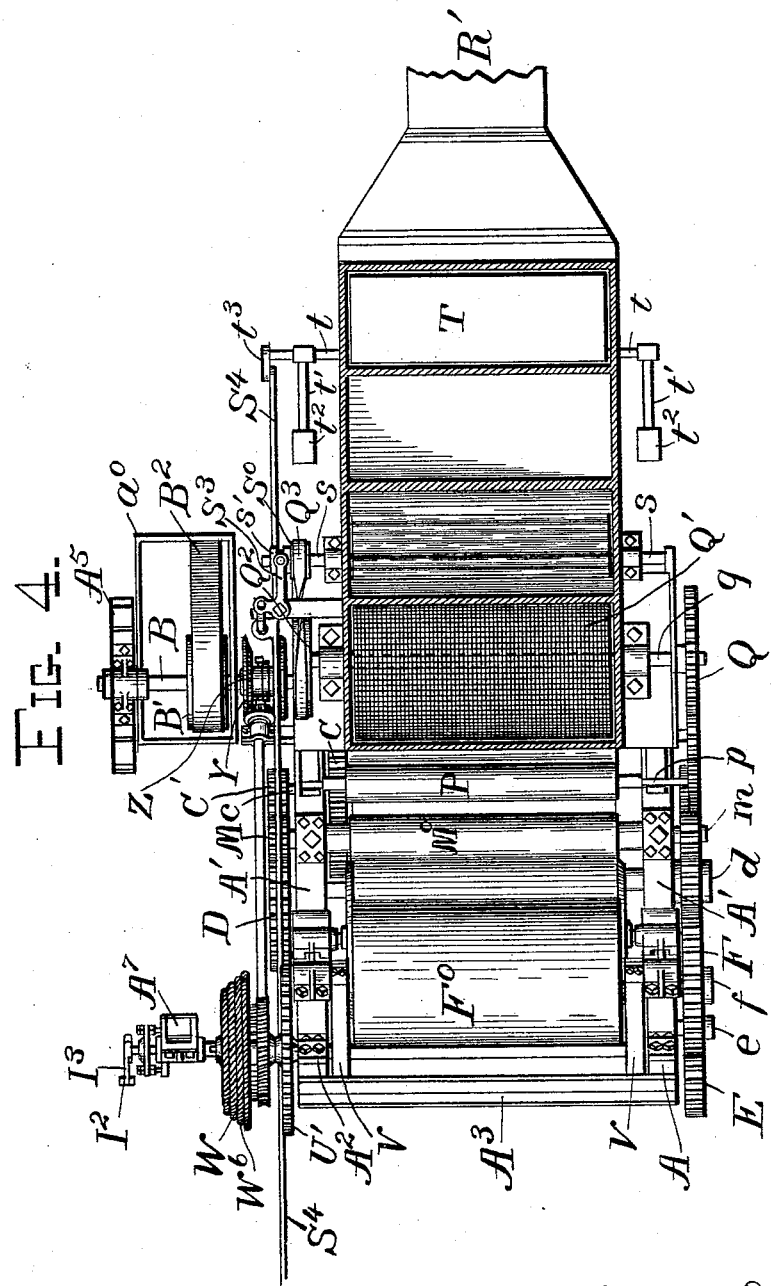
Witnesses
Piercy C. Bowen
M. J. Siousa
Inventors:
Charles L. Bessonette,
William T. Bessonette,
by Whitman & Wilkinson,
Attorneys.

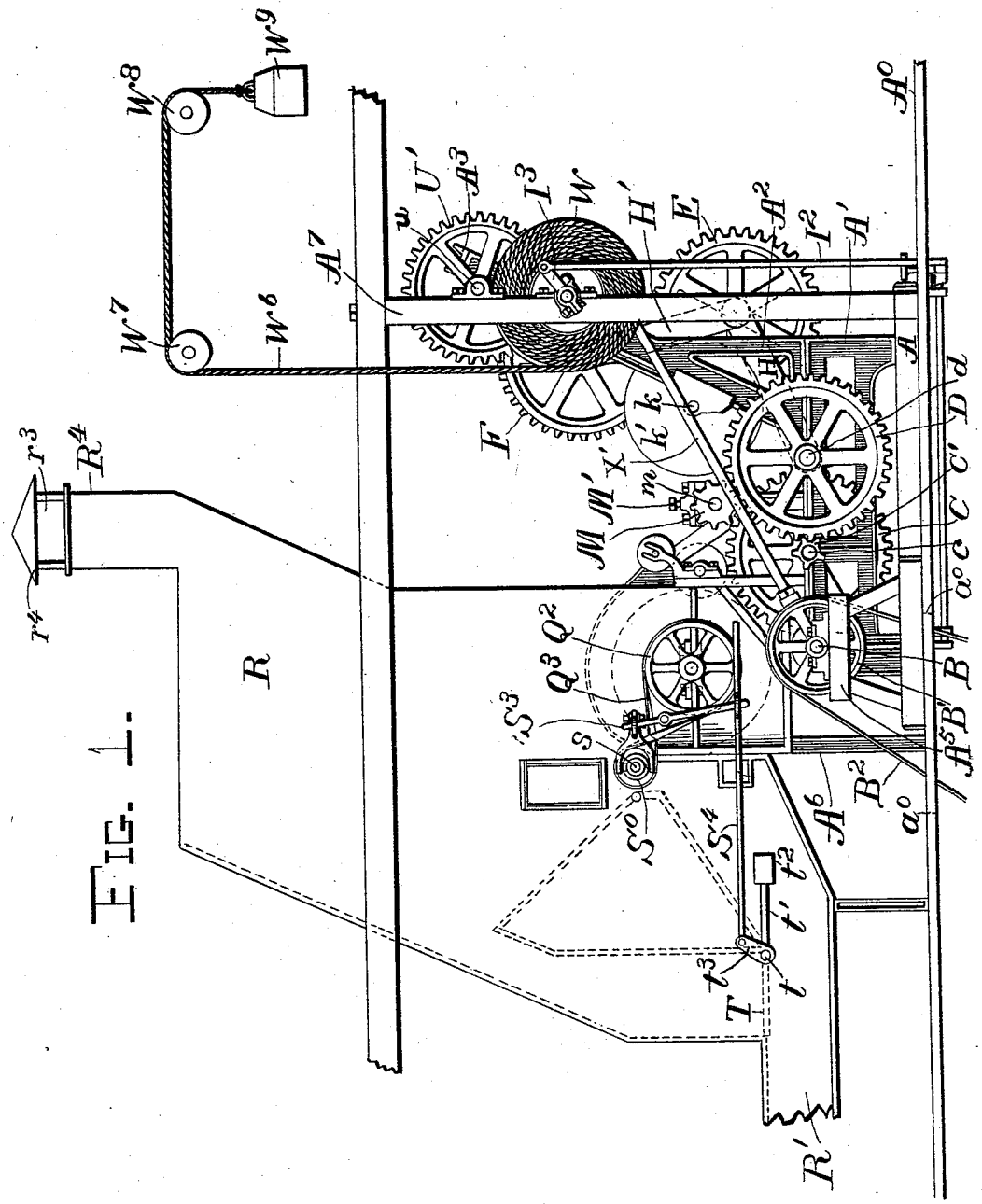

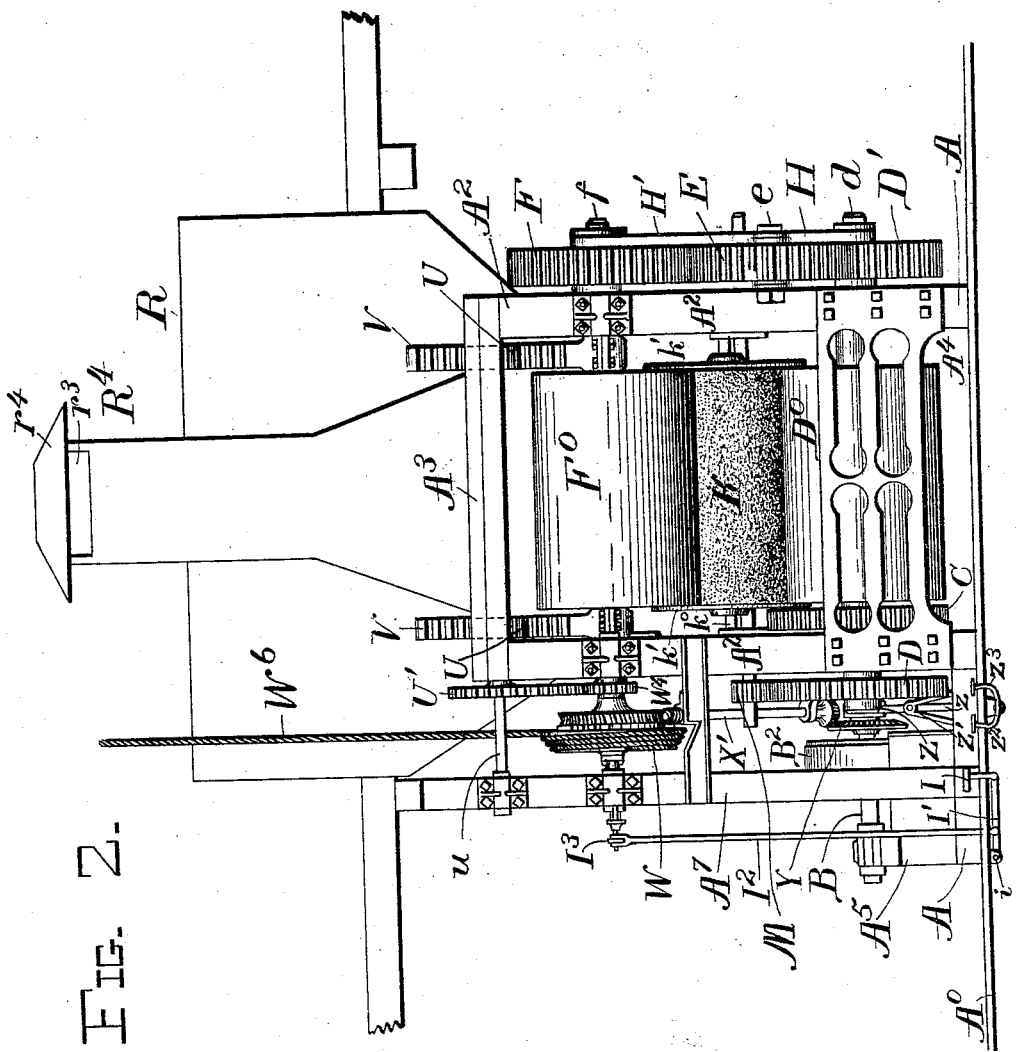

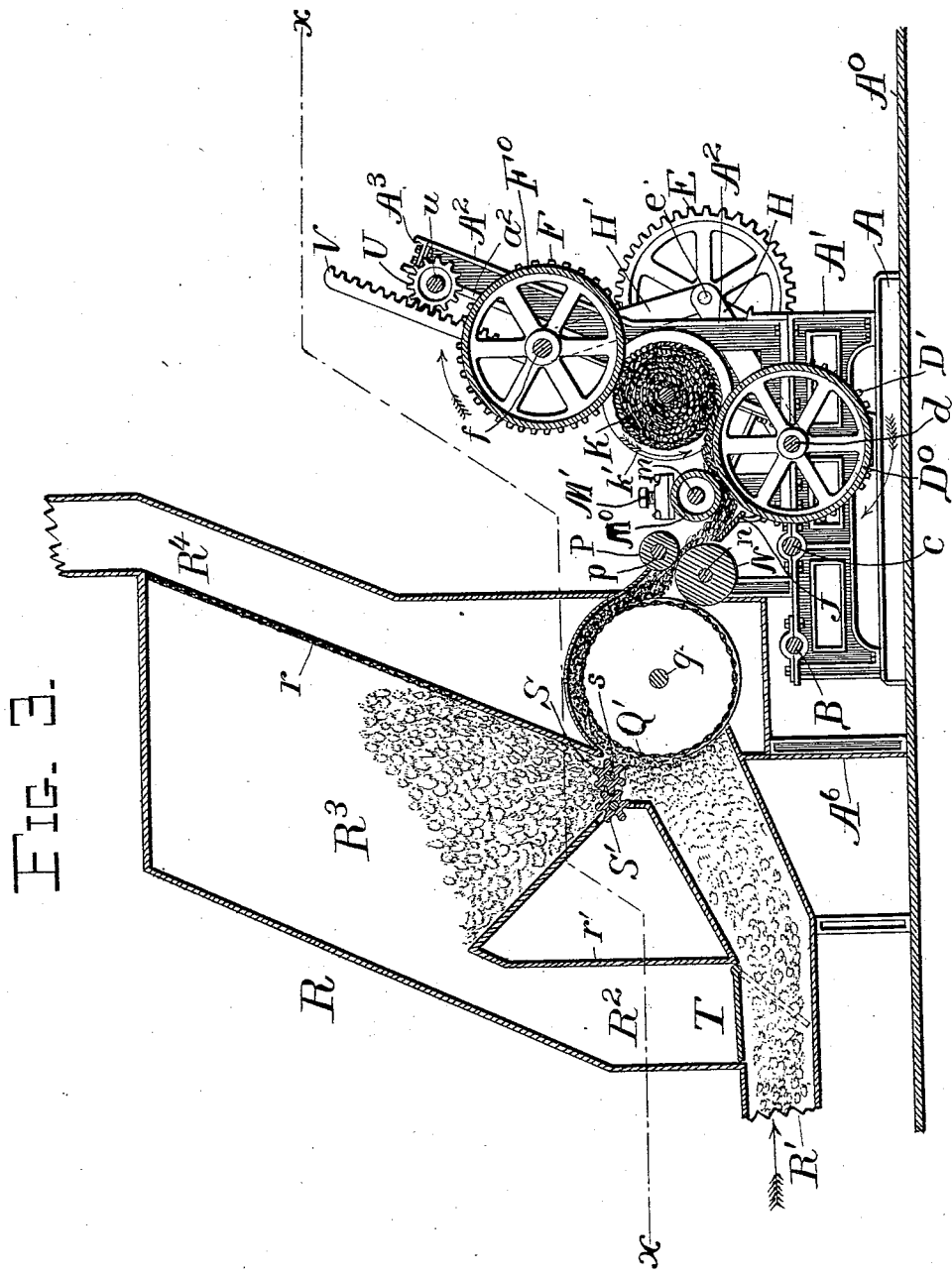

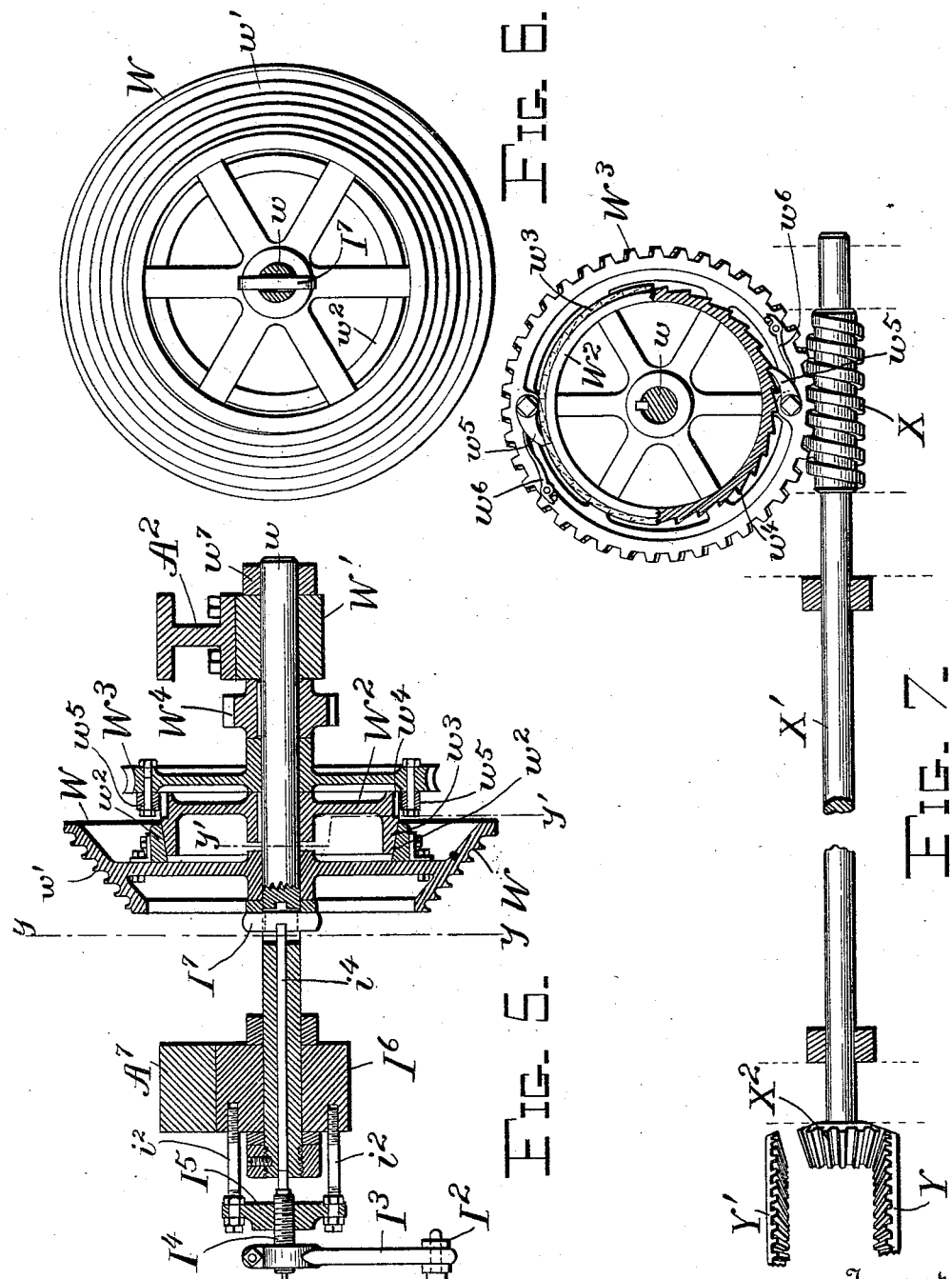

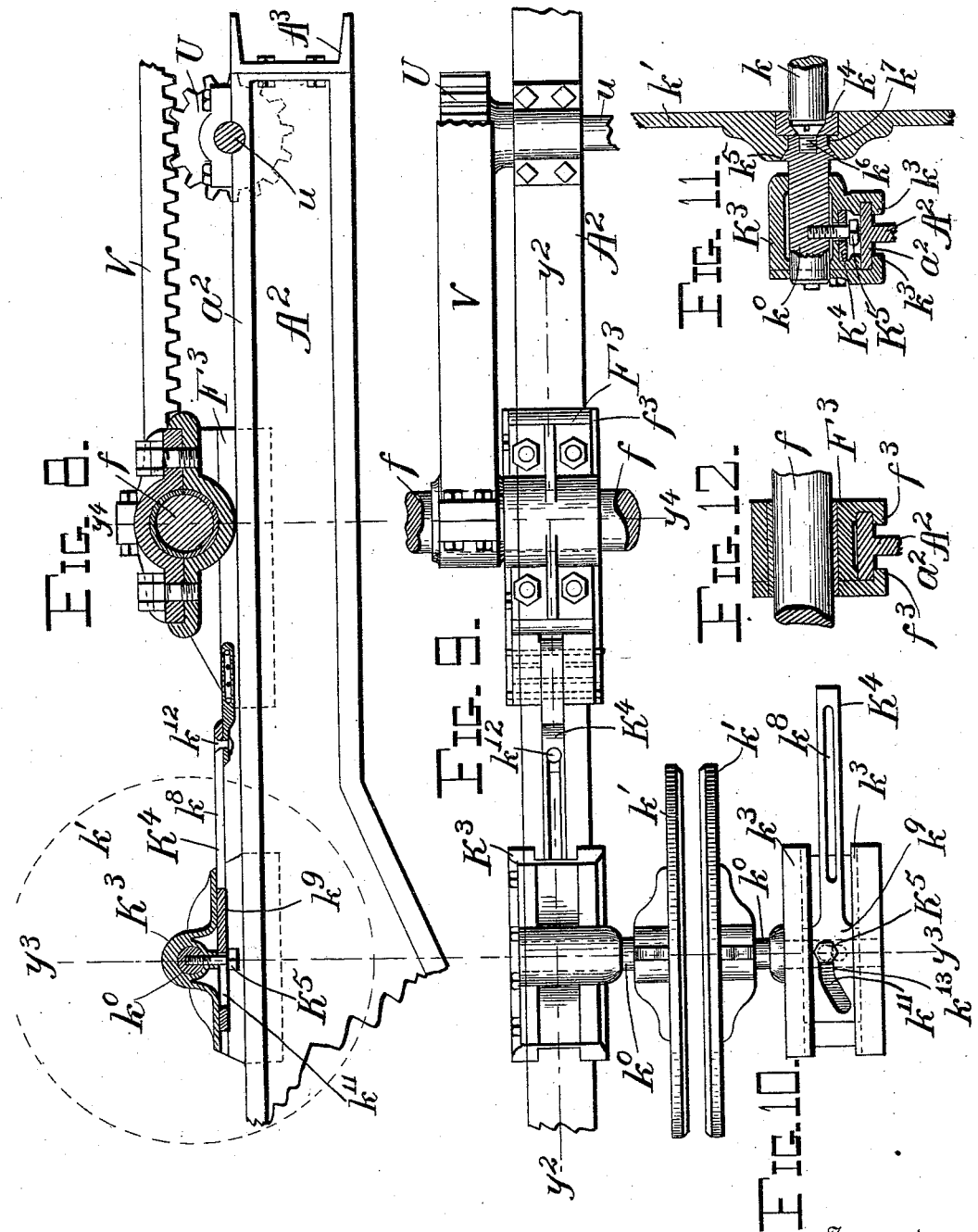

UNITED STATES PATENT OFFICE.

CHARLES L. BESSONETTE AND WILLIAM T. BESSONETTE, OF TEMPLE, ASSIGNORS TO THE BESSONETTE COTTON COMPRESS MANUFACTURING COMPANY, OF WACO, TEXAS.

COTTON-COMPRESS.

SPECIFICATION forming part of Letters Patent No. 530,001, dated November 27, 1894.

Application filed June 5, 1894. Serial No. 513,569. (No model.)

*To all whom it may concern:*

Be it known that we, CHARLES L. BESSONETTE and WILLIAM T. BESSONETTE, citizens of the United States, residing at Temple, in the county of Bell and State of Texas, have invented certain new and useful Improvements in Cotton-Compresses; and we do hereby declare the following to be a full, clear, and exact description of the invention, such as will enable others skilled in the art to which it appertains to make and use the same.

Our invention relates to improvements in that class of cotton compresses in which the cotton is fed to the compress direct from the gin, and is wound into a dense cylindrical bale, and the said invention consists in certain novel means for adding additional pressure to the bale as it is being rolled up, in readily detaching the finished bale from the machine, in providing a reservoir for the surplus cotton, when the gin is running and the machine has stopped, and in certain other novel features of construction and arrangement of parts hereinafter described and claimed.

Reference is had to the accompanying drawings, wherein the same parts are indicated by the same letters throughout the several views.

Figure 1 represents a side elevation of the entire machine, and its connections to the gin, the gin itself being omitted. Fig. 2 represents an end view of the machine as seen from the right of Fig. 1. Fig. 3 represents a central longitudinal section through the machine. Fig. 4 represents a section along the line $x\ x$ of Fig. 3, and looking down. Fig. 5 represents a central longitudinal section through the shaft, of the winding drum. Fig. 6 represents a section of the device shown in Fig. 5, along the line $y\ y$ of the said figure, and looking to the right. Fig. 7 represents a detail view of part of the apparatus for lifting the upper roll, partly in section along the line $y'\ y'$ of Fig. 5. Fig. 8 represents a detail view of part of the apparatus for lifting the upper roll, and detaching the bale. Fig. 9 represents a plan view of the details shown in elevation in Fig. 8. Fig. 10 represents an inverted plan view of one of the movable ends of the core roll, shown in plan in Fig. 9. Fig. 11 represents a section along the line $y^3\ y^3$ of Figs. 8, 9, and 10, and Fig. 12 represents a section along the line $y^4,\ y^4$ of Figs. 8 and 9.

A represents a bed-plate or other suitable foundation for the compress, which is mounted on the floor or platform $A^0$. On this foundation A two flanged side brackets $A'$ are secured, which are strengthened at their ends by channel-ribbed plates $A^4$ as shown in Fig. 2. Mounted over these brackets $A'$ and secured thereto, are similar brackets $A^2$ extending upward and inclined slightly forward, and provided at their upper ends with a transverse tie-plate $A^3$.

$A^5$, $A^6$ and $A^7$ are parts of the framework of the machine which may be made of wood or other suitable material.

B represents the main driving shaft which is itself driven by the belt $B^2$ passing over the pulley $B'$ fast on the said driving shaft. This belt is driven by any suitable source of power, and any other suitable gearing than belt and pulley gearing, may be adopted if desired. The shaft B carries a pinion, not shown, which meshes in the spur wheel C mounted on the shaft $c$, which shaft carries the pinion $C'$ driving the spur wheel D mounted on the shaft $d$. On the opposite end of said shaft $d$, is a gear wheel $D'$ which meshes in the gear wheel E, which in turn meshes in the gear wheel F mounted on the shaft $f$. This shaft $f$ also carries the upper roll $F^0$ while the shaft $d$ carries the lower roll $D^0$, and the two shafts $d$ and $f$ are connected together by straps H and $H'$ which form a toggle joint whose pivot is the short shaft $e$ on which the gear wheel E is mounted. The shaft $d$ carrying the lower roll $D^0$, is journaled in the brackets $A'$, while the shaft $f$ carrying the upper roll is journaled in the heavy blocks $F^3$, which slide along and are held in position by the flanges $a^2$ on the upper side of the upper bracket $A^2$, as will be hereinafter more fully described. The bale K is formed on a spindle $k$ which is held in bearings $k^4$ at the center of the disks $k'$, as shown in detail in Fig. 11. These disks serve to keep the cotton from protruding beyond the ends of the cylindrical bale, and serve to even up the said ends, and between these disks, the upper and lower compression rolls enter and press on the cotton. The said upper and lower rolls are caused by the gearing to revolve in the same direction, and thus the core roll between them is caused to revolve about its axis, the direction of the various rolls being indicated by the arrows in Fig. 3. The core roll is journaled in the sliding blocks $K^3$ which move along the upper part of the bracket $A^2$, and are held on by means of lips overhanging the flanges $a^2$ of the said bracket. The axis of the lower roll being fixed, as the diameter of the bale increases, the axis of the bale moves upward, and the upper roll, which rests on the bale, is also pushed upward through a distance corresponding to the increase in the diameter of the bale.

M represents a pinion which meshes with the gear wheel D and is fast on the shaft $m$ carrying the small roll $M^0$ which presses the cotton bat flat down on the lower roll $D^0$. The pressure of this roller $M^0$ on the roll $D^0$ is adjusted by a screw $M'$ or other suitable pressure regulator.

N and P are two small rollers mounted on the shaft $n$ and $p$ respectively, which draw the cotton from the condenser, and press it out into a thin bat. These rolls are driven by any suitable gearing connected with the driving shaft B.

Q represents a gear wheel mounted on the shaft $q$ and driven by any suitable gearing. The said shaft $q$ carries a condenser covered with wire gauze, and manufactured in the usual way.

R represents a reservoir containing an air passage $R'$ at the base thereof, through which the fleecy cotton is blown direct from the gin to the condenser.

A valve or damper T controls a secondary passage $R^2$ and when dropped down in the position shown in dotted lines in Fig. 3, the cotton entering through the passage $R'$ is diverted upward through the passage $R^2$ and into the funnel-shaped chamber $R^3$, settling in the bottom thereof, while the air passes through the wire screen $r$, and flows outward through the hood $R^4$ which is provided with openings $r^3$ beneath the cap $r^4$, the function of the said cap being to prevent rain from falling through the said hood down on the cotton being forced through the condenser. Thus when the compress apparatus is stopped the cotton from the gin is stored away in this reservoir, from the bottom of which it is taken by the convoluted rollers S and S', which may be thrown in and out of action by any suitable clutch mechanism.

In the device shown in Figs. 1 and 4, $S^0$ represents a clutch on the shaft $s$ which is operated by the lever $S^3$ connected to the hand rod $S^4$ which hand rod is also pivotally connected to the crank $t^3$ fast to the shaft $t$ to which the damper T is rigidly attached. This damper is normally held in the closed position, or that shown in dotted lines in Fig. 1, by means of the arms $t'$ and weights $t^2$. The clutch mechanism is so arranged that the rollers S and S' are in operation whenever the damper is in the raised position shown in Fig. 1, and are thrown out of operation whenever the damper is in the lower position shown in dotted lines in Fig. 3. This may be readily accomplished by any variety of well known clutch connections, and we make no claim to the specific form of clutch employed. The convoluted rollers S and S' are driven by the pulley $Q^2$ and belt $Q^3$ on the condenser shaft $q$. It will be evident that when the compress is not running, the cotton will be piled up in the reservoir, and that as soon as it begins to run again, and the damper T is closed into the reservoir, the cotton will be fed both from the gin and the reservoir to the condenser. The cotton from the condenser is carried in a thin wad or bat between the small rollers P and N and sliding down the table J is pressed by the roller $M^0$ on top of the lower compress roll $D^0$, and there it is caught by the core roll and rolled into a cylindrical bale. As the bale grows in diameter it pushes the upper compress roll $F^0$ upward, while at the same time the said upper roll is revolving continuously on the surface of the bale.

A part of the herein described invention is to increase the pressure on the bale as it increases in diameter, and another part of the present invention is to provide means for quickly removing the finished bale after it has obtained the desired diameter. These two results are obtained by the mechanism shown in detail in Figs. 5 to 11 of the drawings.

W represents a conical drum grooved as at $w'$ on the exterior surface thereof, to receive the rope $W^6$ which passes over the pulleys $W^7$ and $W^8$, and terminates in a weight $W^9$. This drum W is loose on the shaft $w$ which is journaled in a block $W'$ fast to the bracket $A^2$ and held therein by the collar $w^7$. This shaft has secured fast thereon a pinion $W^4$ and a conical clutch $W^2$, between which is revolubly mounted a worm wheel $W^3$ having pawls $w^5$ pressed by springs $w^6$ into the ratchet teeth $w^4$ on the periphery of the cone clutch. The latter has a rigid conical surface $w^3$ which bears against a similar surface $w^2$ on the back of the drum W, when the said drum is forced against the said cone clutch by the mechanism hereinafter to be described. The shaft $w$ is bored longitudinally at its outer end to receive a rod $i^4$ and also has a transverse opening to receive a cross pin $I^7$ which impinges against the hub of the cone wheel W and the said cross pin $I^7$ is recessed to receive the end of the rod $i^4$. An interiorly screw-threaded nut $I^5$ is held firmly just beyond the end of the shaft $w$ by the bolts $i^2$, and a screw-threaded pin $I^4$ is pressed through the said nut and has its inner end reduced to enter the opening in the end of the shaft $w$ and impinge against the rod $i^4$. On the outer end of the pin $I^4$ is secured a lever $I^3$ to which is pivoted a rod $I^2$ which extends downward and is connected with a treadle lever $I'$ terminating in a treadle I. When the treadle I is pressed downwardly it will, through the rod $I^2$, and lever $I^3$, turn the screw-threaded pin $I^4$, pressing its reduced end upon the rod $i^4$ which in turn bears upon the cross pin $I^7$ and forces the drum W back upon the clutch $W^2$ thus causing it to turn with the shaft $w$, which shaft is revolved by the pinion $W^4$ meshing with the gear wheel $U'$ fast on the shaft $u$. This shaft $u$ also carries a pinion U meshing in the cogged rack V carried by the sliding bearing blocks $F^3$ in which the upper roll $F^0$ is journaled. It will be seen that as this upper roll rises, the racks V will cause the pinions U and shafts $u$ to revolve, and the gear wheel $U'$ will turn the pinion $W^4$ and wind up the rope $W^6$ on the drum W, thus exerting a pressure downward on the upper roll.

When the bale has attained the proper size and it is desired to remove the same from the compress the first thing to be done is to relieve the bale of the pressure of the weight $W^9$. This is accomplished by releasing the treadle I which allows the lever $I^3$ and screw pin $I^4$ to turn and thus release the drum W from the clutch $W^2$. This allows the drum to turn freely on the shaft $w$ and let the weight run down. Having thus relieved the roll $F^0$ from the pressure of the weight the next step is to raise the roll $F^0$ from the bale. This is accomplished by means of the miter-gears Y and $Y'$ which are secured to the ends of a spool or sleeve Z keyed on the driving shaft B so as to turn therewith but at the same time be free to slide on the said shaft. The said miter gears Y and $Y'$ engage alternately with the miter pinion $X^2$ fast to the shaft $X'$ carrying the worm X engaging in the worm wheel $W^3$.

The spool loosely connected to the bar $z$, which is pivoted at $z'$, is operated by one or the other of the treadles $z^2$ and $z^3$. The pressure on one of the treadles as $z^3$ will move one of the miter-gears as Y, on the shaft B and will cause the same to engage with the said miter pinion $X^2$ and to revolve the worm X which will turn the worm-wheel $W^3$, causing the said worm-wheel to turn the shaft $w$, and with it the pinion $W^4$. This pinion $W^4$ will turn the gear wheel $U'$ and will cause the pinions U to move the racks V upward and so lift the roll $F^0$ off of the bale K.

The bearing boxes $F^3$ of the roll $F^0$ are connected with the bearing blocks $K^3$ by slotted links $K^4$, which are connected at one end to the bearings $F^3$ and have their other ends spread out as at $k^9$, and arranged to slide in the lower part of the bearing blocks $K^3$. A cam slot $k^{11}$ is formed in the enlarged part $k^9$ of the said link and a screw pin $K^5$ is passed through the said cam slot and screwed or otherwise secured to the short shafts $k^0$ which carry the heads or disks $k'$. Thus it will be seen that as the roll $F^0$ moves upward the bearing blocks $F^3$ will exert a pull upon the links $K^4$ causing the latter to move in the bearing blocks $K^3$ and forcing the pins $K^5$ to travel outward in the cam slots carrying with them the short shafts $k^0$ and moving the two disks $k'$ away from each other. As the core $k$ of the cotton bale is supported by its ends entering a recess in the center of each of the disks $k'$, the outward movement of the disks will disengage the core and allow the bale to drop out it having been previously tied. When the core has been again placed in position pressure upon the other treadle $z^3$ will move the other miter-gear $Y'$ into engagement with the pinion $X^2$ and thus reverse the motion of the shaft $X'$ causing the worm X and worm-wheel $W^3$ to revolve in the opposite direction and through the shaft $w$, and train of gearing connected thereto, lower the racks V, disks $k'$, and roll $F^0$, to their initial positions. When the bearing boxes $K^3$ reach the end of their downward movement the boxes $F^3$ will continue to move downward, the pins $k^{12}$ traveling in the slots $k^8$ in the links $K^4$ to the lower end thereof and then forcing the said links downward until the cam slots $k^{11}$ force the pins $K^5$, the short shafts $k^0$, and the disks $k'$ inward upon the ends of the core $k$ ready to begin the next bale. It will be noted that the upper roll will rise, due to the increase of diameter of the bale twice as fast as the shaft of the core roll and that, therefore, the length and breadth of the slot $k^8$ must be sufficient to allow the pin $k^{12}$ to travel freely therein while the bale is being formed. Moreover, the upper part of the cam groove $k^{11}$ should be either flattened as shown at $k^{13}$ in Fig. 10, or should be of such a slope that the pin $K^5$ should not be caused to slide down the same by the lateral pressure of the cotton in the bale on the heads $k'$.

It will be obvious that various modifications of the herein described devices might be made which could be used without departing from the spirit of our invention.

Having thus described our invention, what we claim, and desire to secure by Letters Patent of the United States, is—

1. In a cotton compress for the manufacture of cylindrical bales, the combination with a lower compressing roll; of a core roll journaled in movable bearings above the same; an upper compressing roll mounted on a movable shaft above said core roll; a conical drum, a rope winding on said drum, a suspended weight connected to the said rope; and gearing connecting said shaft and said drum for lifting said weight, and so increasing the pressure on said upper roll, as the diameter of the bale increases, substantially as described.

2. In a cotton compress for the manufacture of cylindrical bales, the combination with a lower compressing roll; of a core roll journaled in movable bearings above the same; an upper compressing roll mounted on a movable shaft above said core roll; a corrugated conical drum, a rope winding on said drum, a suspended weight connected to said rope;

gearing connecting said shaft and said drum and clutch mechanism for throwing said drum into and out of action, substantially as and for the purposes described.

3. In a cotton compress for the manufacture of cylindrical bales, the combination with a lower compressing roll; of a core roll journaled in movable bearings above the same; an upper compressing roll mounted on a shaft above said core roll, movable journal bearings for said shaft, rack bars connected to said journal bearings, pinions meshing in said rack bars, a conical drum; a rope winding on said drum, a suspended weight connected to the said rope; and gearing connecting said pinions and said drum for lifting said weight, and so increasing the pressure on said upper roll, as the diameter of the bale increases, substantially as described.

4. In a cotton compress for the manufacture of cylindrical bales, the combination with a lower compressing roll; of a core roll journaled in movable bearings above the same; an upper compressing roll mounted on a shaft above said core roll; movable journal bearings for said shaft, rack bars connected to said journal bearings; pinions meshing in said rack bars; a conical drum; a rope winding on said drum; a suspended weight connected to the said rope; gearing connecting said pinions and said drum; and clutch mechanism for putting said drum into and out of action, substantially as and for the purposes described.

5. In a cotton compress for the manufacture of cylindrical bales, the combination with a lower compressing roll; of a core roll journaled in movable bearings above the same; an upper compressing roll mounted on a movable shaft above said core roll; movable journal bearings for said shaft; rack bars connected to said journal bearings; pinions meshing in said rack bars; a conical drum; a rope winding on said drum; a suspended weight connected to the said rope; and gearing connecting said pinions and said drum for lifting said weight; clutch mechanism for putting said drum into and out of action; and means for unwinding said drum; when the bale is removed from the compress, substantially as and for the purposes described.

6. In a cotton compress for the manufacture of cylindrical bales, the combination with a lower compressing roll; of a core roll journaled in movable bearings above the same; an upper compressing roll mounted on a movable shaft above said core roll; movable journal bearings for said shaft; racks connected to said journal bearings; pinions meshing in said rack bars; a conical drum; a rope winding on said drum; a suspended weight connected to the said rope; gearing connecting said pinions and said drum for lifting said weight; clutch mechanism for putting said drum into and out of action; and gearing and clutch mechanism adapted to revolve said drum in either direction independent of said upper roll, substantially as and for the purposes described.

7. In a cotton compress for the manufacture of cylindrical bales, the combination with a frame, and a lower compressing roll journaled in bearings in said frame; of a core roll journaled in movable bearings above the same; an upper compressing roll mounted in movable journal bearings above said core roll, adjustable connections between said bearings for the upper roll and the core roll and means for lifting the upper roll and simultaneously detaching the core roll from its bearings, substantially as and for the purposes described.

8. In a cotton compress for the manufacture of cylindrical bales, the combination with a frame, and a lower compressing roll journaled in bearings in said frame; of a core roll, bearings for the core roll movable upward and horizontally; an upper compressing roll mounted in movable journal bearings above said core roll; slotted links connecting the bearings of said upper roll; and the bearings of said core roll and provided with cam grooves therein; pins projecting from the core roll bearings into said cam grooves, and means for simultaneously lifting said upper roll and forcing apart said pins, substantially as and for the purposes described.

9. In a cotton compress for the manufacture of cylindrical bales, the combination with a frame, and a lower compressing roll journaled in fixed bearings in said frame; of a core roll; bearings for the same movable upward and horizontally; an upper compressing roll mounted in movable journal bearings above said core roll; slotted links held against lateral motion connecting the bearings of said upper roll and the bearings of said core roll, and provided with cam grooves therein; pins projecting from said movable core roll bearings into said cam grooves; means for lifting said upper roll and causing said cam grooves to force said movable core roll bearings apart and detach the bale, and means for lowering said upper roll and causing said movable core roll bearings to return to the holding position, substantially as and for the purposes described.

10. In a cotton compress for the manufacture of cylindrical bales, the combination with a frame, and a lower compressing roll journaled in fixed bearings in said frame; of a core roll; bearings for the same movable upward and horizontally; an upper compressing roll mounted in movable journal bearings above said core roll; slotted links held against lateral motion connecting the bearings of said upper roll and the bearings of said core roll, and provided with cam grooves therein, pins projecting from said movable core roll bearings into said cam grooves; gearing for lifting and lowering said upper roll, and the link connected thereto, and so moving said core roll bearings apart and together again;

and a clutch coupling for operating said gearing in either direction, substantially as and for the purposes described.

11. In a cotton compress for the manufacture of cylindrical bales, the combination with a frame, and a lower compressing roll journaled in fixed bearings in said frame; of a core roll; bearings for the same movable upward and horizontally; an upper compressing roll mounted in movable journal bearings above said core roll; slotted links held against lateral motion, connecting the bearings of said upper roll and the bearings of said core roll, and provided with cam grooves therein; pins projecting from said movable core roll bearings into said cam groove; racks attached to said upper roll bearings, pinions, meshing in said racks, and means for revolving said pinions in either direction and so raising and lowering said upper roll, and thereby regulating the position of said core roll bearings, substantially as and for the purposes described.

12. In a cotton compress for the manufacture of cylindrical bales, the combination with a frame, and a lower compressing roll journaled in fixed bearings in said frame; of a core roll; bearings for the same, movable upward and horizontally; an upper compressing roll mounted in movable journal bearings above said core roll; slotted links held against lateral motion, connecting the bearings of said upper roll and the bearings of said core roll, and provided with cam grooves therein; pins projecting from said movable core roll bearings into said cam grooves, racks attached to said upper roll bearings, pinions meshing in said racks, gearing for driving said pinions, and clutch mechanism for putting said gearing into action in either direction and so raising or lowering said upper roll, substantially as and for the purposes described.

13. In a cottom compress of the character described, the combination with a core roll and journal bearings for the same, of a cam adapted to move one of said journal bearings longitudinally along the axis of the core roll, and means for operating said cam, substantially as and for the purposes described.

14. In a cotton compress of the character described, the combination with a core roll and journal bearings for the same, of a stud or pin projecting from one of said bearings, a cam groove adapted to engage said stud or pin and to move the same in the direction of the axis of the core roll, and means for operating said cam, substantially as and for the purposes described.

15. In a cotton compress of the character described, the combination with a core roll, of journal bearings for the same adapted to be moved longitudinally along the axis of the core roll, and to release the said core roll, cams adapted to move said journal bearings longitudinally, and means for operating said cams, substantially as and for the purposes described.

16. In a cotton compress of the character described, the combination with a core roll, of journal bearings for the same adapted to move longitudinally along the axis of the core roll, and to release the said core roll, studs or pins projecting from said journal bearings, cam grooves engaging said studs or pins, and moving said journal bearings in the direction of the axis of the core roll, and means for operating said cams, substantially as and for the purposes described.

17. In a cotton compress for the manufacture of cylindrical bales, the combination with a frame, and a lower compressing roll journaled in bearings in said frame; of a core roll journaled in movable bearings above said frame; an upper compressing roll mounted in movable journal bearings above said core roll; a suspended weight connected to the upper roll; means operated by said upper roll for lifting said weight and so increasing the pressure on the upper roll as the diameter of the bale increases; adjustable connections between the bearings for the upper roll and the core roll, and means for lifting the upper roll and simultaneously detaching the core roll from its bearings, substantially as and for the purposes described.

18. In a cotton compress for the manufacture of cylindrical bales, the combination with a frame, and a lower compressing roll journaled in bearings in said frame; of a core roll; bearings for the core roll movable upward and horizontally; an upper compressing roll mounted in movable journal bearings above said core roll; a suspended weight connected to the upper roll; means operated by said upper roll for lifting said weight and so increasing the pressure on the upper roll as the diameter of the bale increases; slotted links connecting the bearings of said upper roll, and the bearings of said core roll and provided with cam grooves therein; pins projecting from the core roll bearings into said cam grooves, and means for simultaneously lifting said upper roll and forcing apart said pins, substantially as and for the purposes described.

19. In a cotton compress for the manufacture of cylindrical bales, the combination with a frame, and a lower compressing roll journaled in fixed bearings in said frame; of a core roll; bearings for the same movable upward and horizontally; an upper compressing roll mounted in movable journal bearings above said core roll; a suspended weight connected to the upper roll; means operated by said upper roll for lifting said weight and so increasing the pressure on the upper roll as the diameter of the bale increases; slotted links held against lateral motion connecting the bearings of said upper roll and the bearings of said core roll, and provided with cam grooves therein; pins projecting from said movable core roll bearings into said cam grooves; means for lifting said upper roll and causing said cam grooves to force said movable core roll bearings apart and detach the bale, and means for lowering said upper roll and causing said movable core roll bearings to return to the holding position, substantially as and for the purposes described.

20. In a cotton compress for the manufacture of cylindrical bales, the combination with a frame, and a lower compressing roll journaled in fixed bearings in said frame; of a core roll; bearings for the same movable upward and horizontally; an upper compressing roll mounted in movable journal bearings above said core roll; a suspended weight connected to the upper roll; means operated by said upper roll for lifting said weight and so increasing the pressure on the upper roll as the diameter of the bale increases; slotted links held against lateral motion connecting the bearings of said upper roll and the bearings of said core roll, and provided with cam grooves therein, pins projecting from said movable core roll bearings into said cam grooves; gearing for lifting and lowering said upper roll, and the link connected thereto, and so moving said core roll bearings apart and together again; and a clutch coupling for operating said gearing in either direction, substantially as and for the purposes described.

21. In a cotton compress for the manufacture of cylindrical bales, the combination with a frame, and a lowering compressing roll journaled in fixed bearings in said frame; of a core roll; bearings for the same movable upward and horizontally; an upper compressing roll mounted in movable journal bearings above said core roll; a suspended weight connected to the upper roll; means operated by said upper roll for lifting said weight and so increasing the pressure on the upper roll as the diameter of the bale increases; slotted links held against lateral motion, connecting the bearings of said upper roll and the bearings of said core roll, and provided with cam grooves therein; pins projecting from said movable core roll bearings into said cam grooves; racks attached to said upper roll bearings; pinions meshing in said racks, and means for revolving said pinions in either direction and so raising and lowering said upper roll, and thereby regulating the position of said core roll bearings, substantially as and for the purposes described.

22. In a cotton compress for the manufacture of cylindrical bales, the combination with a frame, and a lower compressing roll journaled in fixed bearings in said frame; of a core roll; bearings for the same, movable upward and horizontally; an upper compressing roll mounted in movable journal bearings above said core roll; a suspended weight connected to the upper roll; means operated by said upper roll for lifting said weight and so increasing the pressure on the upper roll as the diameter of the bale increases; slotted links held against lateral motion, connecting the bearings of said upper roll and the bearings of said core roll, and provided with cam grooves therein; pins projecting from said movable core roll bearings into said cam grooves; racks attached to said upper roll bearings, pinions meshing in said racks, gearing for driving said pinions, and clutch mechanism for putting said gearing into action in either direction and so raising or lowering said upper roll, substantially as and for the purposes described.

23. In a cotton compress of the character described, the combination with a condenser and a flue leading from the gin to the condenser, a reservoir connected to said flue and to said condenser, and a damper for deflecting the cotton blown from the gin into said reservoir when desired, substantially as and for the purposes described.

In testimony whereof we affix our signatures in presence of two witnesses.

CHARLES L. BESSONETTE.
WILLIAM T. BESSONETTE.

Witnesses:
DANIEL WISE,
ROBERT J. TOLSON.